Nov. 27, 1923.   1,475,408
R. I. REED
FISHING TACKLE
Filed Jan. 10, 1923
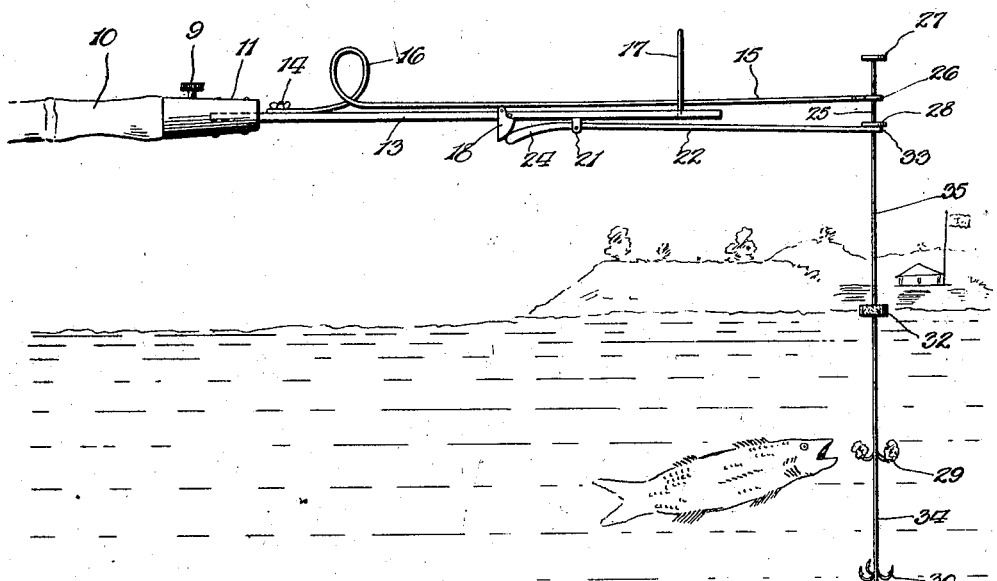
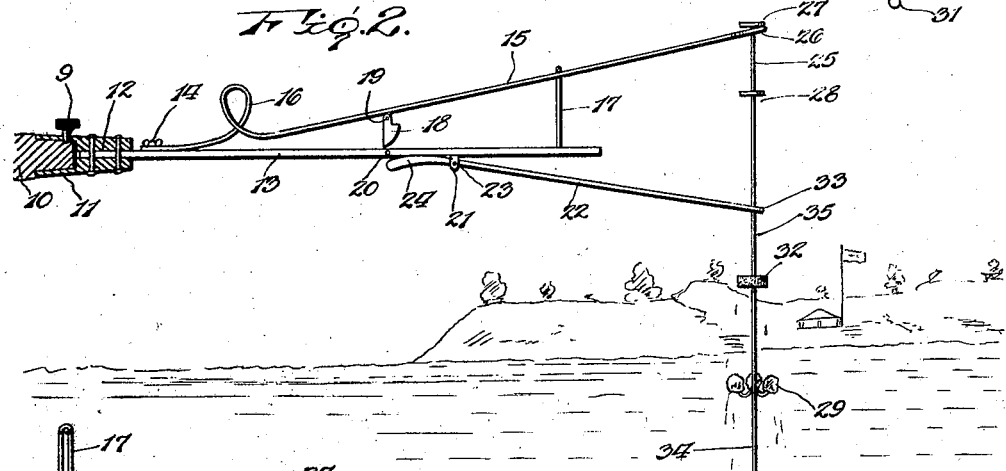
Inventor
Robert I. Reed
By
Attorneys Patented Nov. 27, 1923.

1,475,408

UNITED STATES PATENT OFFICE.

ROBERT I. REED, OF LOVELAND, OKLAHOMA.

FISHING TACKLE.

Application filed January 10, 1923. Serial No. 611,854.

*To all whom it may concern:*

Be it known that I, ROBERT I. REED, a citizen of the United States, residing at Loveland, in the county of Tillman and State of Oklahoma, have invented certain new and useful Improvements in Fishing Tackle, of which the following is a specification.

My invention relates to improvements in fishing tackle and comprises an attachment for use on an ordinary fishing pole.

The main object of the invention is to provide a means to make sure that the fish will be caught even with the lightest nibble at the bait. For this purpose an extra set of hooks is attached to the line in addition to the ordinary bait hooks and the line is suspended from the end of an extension rod secured in the fishing pole in such a manner that a slight pull on the line will release a catch and automatically draw the line quickly upwards.

In the accompanying drawing one embodiment of the invention is illustrated; and

Figure 1 shows a side elevation of the fishing tackle baited and set for catching the fish;

Figure 2 is a similar view to Figure 1 with the catch released and the fish caught; and Figure 3 is a fragmentary perspective view of the forward end of the fishing tackle.

In the drawing reference numeral 10 represents the outer end of an ordinary fishing pole reinforced by a collar or ferrule 11 which has a socket 12 into which the extension rod 13 of the device is inserted and permanently secured by rivets or soldering. The thumb screw 9 is threaded in the ferrule 11 and intended to plant and hold the ferrule with the extension rod 13 securely on the end of the pole.

The extension rod 13 is preferably made of a fairly stiff steel or brass rod and on top of this extension rod 13 is rigidly secured by means of a screw or the like, as at 14, a spring wire 15 which may be looped as at 16 to increase its flexibility. Near the forward end of the extension rod 13 is provided a staple 17 straddling the spring wire 15 in order to limit its upward movement. About midway between the staple 17 and the securing point 14 of the spring wire is attached in any suitable manner a trip or catch 18, which is swiveled as at 19 on the under side of the spring wire 15. This trip 18 is intended to latch with the side-ways extending stud 20 furnished on the extension rod 13.

A short distance in front of this stud 20 is furnished a small bearing 21 in which the releasing bar or lever 22 is journaled as at 23. This releasing bar 22 is provided with a tail end 24 of cam shape adapted to contact with the forward rounded face of the trip 18, when the device is in set position, as seen in Figure 1. At the forward end of the releasing bar 22 is formed a small eye 33 through which the fish line 35 runs. This line is preferably made of fine wire and extends upwards, as at 25, through another eye 26 formed at the end of the spring wire 15. Spaced a certain distance on this line and rigidly secured thereto are two washers, the upper one 27 situated above the eye 26 at the extreme end of the wire 25, while the second washer 28 is adapted to rest on the eye 33 at the free end of the releasing bar 22, as seen in Figure 1, while the upper washer 27 stands a short distance above the eye 26. The eyes 26 and 33 are spring or snap eyes permitting the insertion of the line side-ways and the latter may be made of silk or ordinary fish line, provided that the top and bottom ends 25 and 34 are made of stiff wire.

At a suitable distance below the washer 28 are provided a set of bait hooks 29 and below the latter grab hooks 30 are secured near the lower end 34 of the line 35. The extreme lower end of the line is preferably furnished with a sinker 31 in order to keep the line taut when lowered into the water. A third washer or float 32 preferably of cork may be provided on the line, slidable up and down above the bait hooks 29 for adjusting the depth to which the hooks may be lowered.

This fishing tackle is used in the following manner; referring particularly to Figures 1 and 3, which show the device in set position, the second washer 28 in this case rests on the eye 33, while the cam of the tail end 24 engages with the forward rounded side of the trip 18, which is hooked under the stud 20 in this manner tensioning the spring rod 15, holding it in its lowered position, as seen in these two figures. The upper washer 27 is now standing above the eye 26 of the spring wire 15. After the hooks 29 have been baited the line 35 is now lowered into the water suspended from the eye 33 on the releasing bar 22 and the sinker 31 will keep the line taut as indicated in Figure 1. The engagement between the tail piece 24 and the trip 18 is very sensitive, so that the slightest pull on the line, as when a fish tries to remove the bait from the hooks 29 will lower the forward end of the releasing bar or lever 22 through the intermediary of the washer 28 and the eye 33. This pulling on the line and swinging of the releasing bar 22 will turn the tail piece 24 to push the trip 18 in rearward direction, thereby releasing the engagement between the latter and the stud 20. As the hold on the spring wire 15 has now ceased, the latter deflects upward from the extension rod 13, as seen in Figure 2, and in doing so engages with the upper washer 27 giving a violent pull on the line 35, so that the grab hooks 30 are tugged upwards before the fish has time to escape, catching it as seen in this figure. The function of the third or lowermost washer or float 32 will be evident. It is provided for adjusting the length of line sunk in the water and will also prevent the entanglement of the portion of the line 35 situated between the two washers 28 and 32 in case the trip 18 should be released accidentally by a slight touch of the releasing bar 22. In that case the spring wire 15 will not be able to draw said portion of the line 35 upwards more than until the lower washer 32 catches underneath the eye 33, as without the lower washer or float 32, a considerably greater length of the lower end of the line might slip through the eye 33, independent of the washer 28, as the latter in this respect only governs the short length of the line 25 above the same.

Having thus described the invention, what is claimed as new is:

1. A fishing tackle comprising a relatively rigid rod, a spring wire attached adjacent one end thereof and extending beyond the other end of said rod and provided with an eye at its extreme free end, a fish line slidably suspended from this eye and a catch holding the wire in set position, means engaging with the fish line and being associated with said catch to release the latter when a pull is exerted on said line, bait carrying elements on said line, grab hooks secured on the line below said elements and a pair of washers secured at the upper end of said line and spaced sufficiently apart to permit the lower one of said washers to rest upon said releasing means while the upper washer is raised above said eye, when the device is in set position.

2. A fishing tackle comprising a relatively rigid rod, a spring wire attached adjacent one end thereof and extending beyond the other end of said rod and provided with an eye at its extreme free end, a fish line slidably suspended from this eye and provided with an abutment element and a catch holding the wire in set position, means engaging with the fish line and being associated with said catch to release the latter when a pull is exerted on said line, bait carrying elements on said line, grab hooks secured on the line below said elements, said means including a lever journaled on said rod, a cam on said lever engaging with said catch when in set position and an eyelet at the extreme end of the lever through which said line is guided, and from which it is suspended through the intermediary of said abutment element when in set position.

3. A fishing tackle comprising a relatively rigid rod, a spring wire attached adjacent one end thereof and extending beyond the other end of said rod and provided with an eye at its extreme free end, a fish line suspended from this eye and a catch holding the wire in set position, means engaging with the fish line and being associated with said catch to release the latter when a pull is exerted on said line, bait carrying elements on said line, grab hooks secured on the line below said elements, said means including a lever journaled on said rod, a cam on said lever engaging with said catch when in set position, an eyelet at the extreme end of the lever through which said line is guided and a pair of washers secured at the upper end of said line and spaced sufficiently apart to permit the lower one of said washers to rest upon said releasing means, while the upper washer is raised above said eye, when the device is in set position.

4. The combination with a fishing pole having a socket at one end and a set screw associated with said socket; of a relatively rigid rod fitting in said socket, a spring wire attached adjacent one end of said rod and extending beyond the free end thereof and provided with an eye at its extreme free end, a lever fulcrumed on said rod having an eye at one end in alinement with said first eye, a trip journaled on said spring wire and a stud on said rod to engage with said trip, a cam portion on said lever engaging with said trip when the device is in set position, a fish line engaging with both of said eyes and provided with bait hooks and grab hooks below said bait hooks, spaced washers at the upper end of the line situated one above and one below said first eye permitting the suspension of the fish line by means of the lower washer from said lever and a staple straddling said spring wire and secured on said rod permitting a limited deflection of the spring wire when released.

In testimony whereof I affix my signature.

ROBERT I. REED [L. S.]